United States Patent [19]

Ciulla

[11] 4,301,612
[45] Nov. 24, 1981

[54] LOBSTER TRAP

[76] Inventor: Stephen B. Ciulla, 21 MacKenzie La., Wakefield, Mass. 01880

[21] Appl. No.: 923,789

[22] Filed: Jul. 12, 1978

[51] Int. Cl.² ............................................. A01K 69/08
[52] U.S. Cl. .......................................... 43/100; 43/65
[58] Field of Search ................... 43/102, 100, 58, 64, 43/60, 65, 71, 103, 104, 105

[56] References Cited

U.S. PATENT DOCUMENTS

| | | | |
|---|---|---|---|
| 1,415,801 | 5/1922 | Corle | 43/65 |
| 2,119,828 | 6/1938 | Nordenstam | 43/65 |
| 3,821,861 | 7/1974 | Jalbert | 43/65 |

*Primary Examiner*—Othell M. Simpson
*Assistant Examiner*—Roscoe V. Parker
*Attorney, Agent, or Firm*—Wolf, Greenfield & Sacks

[57] ABSTRACT

A trap includes an outer shell having an entrance at one end and a removable end plate at the other end. The outer shell has a number of holes for the passage of water inside the outer shell. An inner shell that also has water passage holes and that preferably is on the order of one half the length of the outer shell, is pivotally supported in the outer shell adjacent the entrance of the outer shell. The inner shell is pivotally supported about its center axis and has defined as part thereof a ramp that is weighted so that the ramp assumes the proper position to extend upwardly from the entrance.

16 Claims, 5 Drawing Figures

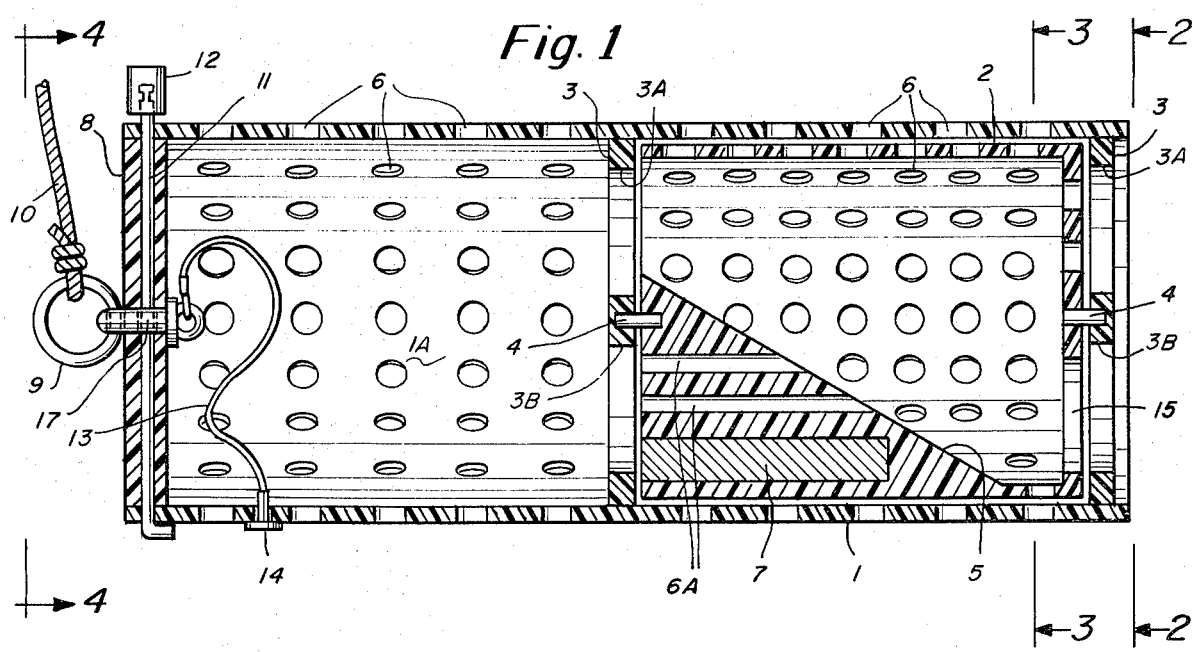

LOBSTER TRAP

BACKGROUND AND SUMMARY OF THE INVENTION

The present invention relates in general to a lobster trap and is concerned, more particularly, with an improved lobster trap construction, one in which it is difficult for the lobster to escape.

One of the objectives of the present invention is to provide an improved lobster trap and one in which the lobster trap is constructed so that it is quite difficult for the lobster to escape from the trap once he has entered the trap and reached the bait therein.

Another object of the present invention is to provide a lobster trap that is of relatively simple construction and which can be opened quite easily for ready access to the lobsters within the trap.

Still another object of the present invention is to provide a lobster trap that requires very little maintenance and which can be quite easily constructed of a lightweight material.

To accomplish the foregoing and other objects of this invention there is provided a lobster trap that comprises an outer shell having water passage holes therein including means at one end of the shell defining an entrance. At the other end of the outer shell there is provided an access opening which is preferably covered by a removable plate or the like. The plate is usually locked in position when the trap is to be used but may be unlocked to provide access to the interior of the outer shell where the lobsters are disposed. The lobster trap also includes an inner shell that also has water passage holes therein and includes both entrance and exit means. The inner shell and outer shell are both preferably cylindrical, although the inner shell may be cylindrical while the outer shell is square or rectangular. The inner shell has a length less than the length of the outer shell and in the preferred embodiment has a length on the order of one half of the length of the outer shell thereby defining a substantially open compartment between the inner shell and outer shell. Means are provided for supporting the inner shell at the one end of the outer shell adjacent the entrance of the outer shell. The support means preferably comprises pivotal support means. A ramp is disposed in the inner shell and it actually forms an integral part thereof. This ramp extends between the entrance and exit means of the inner shell and is weighted so that regardless of the position of the outer shell when it rests on the ocean bottom, the inner shell is pivoted so that the ramp slopes upwardly from the entrance to the lobster trap to the exit from the inner shell into the space defined between the inner shell and the outer shell. This space is longitudinally disposed of the inner shell, and because of the position of the ramp, a lobster entering the inner shell through the aligned entrances of the inner and outer shells progresses up the ramp and then downwardly enters the space in the outer shell that is disposed longitudinally adjacent to the inner shell. It is this space, preferably of a volume corresponding to the volume of the inner shell that the bait for the lobster is disposed. The trap, is provided also with a lift line, which in the disclosed embodiment is secured to the removeable end plate.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a longitudinal cross-sectional view of a preferred embodiment of the lobster trap of this invention;

FIG. 2 is an end view as taken along line 2—2 of FIG. 1 showing the entrance end of the lobster trap;

FIG. 3 is a cross-sectional view at the entrance end of the lobster trap as taken along line 3—3 of FIG. 1;

FIG. 4 is an end view as taken at the opposite end of the lobster trap as shown along line 4—4 of FIG. 1; and FIG. 5 is a view similar to the one shown in FIG. 4 for an alternate embodiment of the invention employing a square-shaped outer shell rather than a cylindrical-shaped outer shell.

DETAILED DESCRIPTION

Referring now to the drawings, the lobster trap shown in FIGS. 1-4 comprises an outer shell 1 which is of cylindrical-shape open at both ends. As viewed in FIG. 1, the right end of the outer shell 1 may be termed the entrance end, and the left end, the exit end.

At the entrance end of the outer shell 1 there is supported an inner shell 2. Both the inner and outer shells are provided with a number of water passage holes 6. The inner shell is provided with such holes 6 about its circumferential surface and also at at least one end as depicted in FIG. 2. The inner shell 2 is supported in the outer shell between the pair of discs 3 each of which has a pair of apertures, 3A, 3B as depicted in FIGS. 1 and 2. The inner shell 2 is supported along its center longitudinal axis by means of separate pins 4 each of which are either fixed in the shell or the disc 3. The pivot pin arrangement including the pins 4 permit free rotation of the inner shell 2 relative to the outer shell 1 which may be considered as fixed in position when the lobster trap is in place on the bottom of the ocean floor. In the position shown in FIG. 2, for example, it is noted that the opening 15 in the inner shell in combination with the aperture 3B in the disc 3 forms an entrance means into the lobster trap. At the output end of the inner shell 2 there is provided an opening 2A as depicted in FIG. 3 which cooperates with the aperture 3A shown in FIG. 1 to provide an exit from the inner shell into the space 1A defined between the disc 3 at the center of the outer shell and the end plate 8. It is within the space 1A that the bait for attracting the lobster is preferably disposed.

Integral with the inner shell 2 is a ramp 5 that extends between the entrance port 15 and the exit port 2A both associated with the inner shell. At the bottom end of the ramp 5 there is disposed a weight 7. Also, the ramp 5 is provided with a series of longitudinal passages 6A which are also water passages functioning as the water passage holes 6.

The exit open end of the outer shell 1 is covered by means of the end plate 8 which is secured in position by the locking rod 11 which extends through the plate 8 and also through end holes in the outer shell 1. A lock 12 is preferably associated with the rod 11 for holding the rod in place and preventing it from disengaging from the plate 8.

A retainer 17 is supported at the center of the plate 8 and holds at its outer end a securing ring 9 to which the lift line 10 may be secured. The other end of the retainer 17 has an eye for supporting one end of a safety line 13 which is used to prevent entire separation of the plate 8 from the outer shell. The other end of the safety line 13 connects to holder 14. The retainer 17 may be secured in place by means of the ring 9 fixed on one side of the plate 8 and a flange on the other side of plate 8 adjacent the eye of the retainer.

When the lobster trap is lowered into the water, the trap may come to rest on the ocean floor in virtually any position. However, because of the weighted inner shell the inner shell will rotate to a position as depicted in FIG. 1 so that the ramp 5 is always extending upwardly toward the space 1A.

FIG. 5 shows an alternate embodiment of the present invention. In this embodiment primed like reference numerals are used to identify similar parts. Thus, in the embodiment of FIG. 5 there is shown an outer shell 1' that is of square cross-section. The inner shell 2' is shown of circular cross-section and in FIG. 5 there is also shown the lock 12', holder 14', entrance 15', water passage holes 6', pivot pin 4', and square end disc 3' and in the embodiment of FIG. 5 the disc 3' is somewhat different in that it has two orthogonally disposed cross pieces whereas the embodiment depicted in FIG. 2 has only a single cross member from which the pivot pin is supported at the center thereof.

The second version shown in FIG. 5 may be the preferred version because, with the square or rectangular shaped outer shell, one is fairly assured that the lobster trap can assume only one of four different positions depending upon which flat outer surface rests upon the ocean bottom. Thus, the entrance 15' should always be in a position substantially as shown in FIG. 5 wherein the cross pieces of the end member 3' do not interfere or block the entrance into the lobster trap. In the first version, because the lobster trap can assume any one of a number of different positions, it may be desirable to make the entrance 15 larger than depicted in FIG. 2. Also, the cross piece depicted in FIG. 2 of the disc 3 has been shown narrowed so as to interfere less with the entrance 15. In still a further version of the invention, the inner shell may be provided with two or more entrances 15.

What is claimed is:

1. A lobster trap comprising;
   an outer shell having water passage holes therein and including means at one end thereof defining an entrance and means at the other end thereof defining an access opening thereto,
   removeable means for covering the access opening when the trap is to be used,
   an inner shell having water passage holes therein and including entrance and exit means, said inner shell having a length less than the length of the outer shell,
   means supporting said inner shell in said outer shell in proximity to the entrance to the outer shell,
   and a ramp in said inner shell extending between the entrance and exit means thereof,
   said means for supporting said inner shell including pivotal support means permitting pivotal rotation of the inner shell in the outer shell.

2. A lobster trap as set forth in claim 1 wherein said pivotal support means includes a pair of spaced discs each having a pivot pin associated therewith connected with a central axis of the inner shell.

3. A lobster trap as set forth in claim 1 wherein both said inner shell and outer shell have a cylindrical shape.

4. A lobster trap as set forth in claim 1 wherein at least said inner shell is of cylindrical shape.

5. A lobster trap as set forth in claim 4 wherein said outer shell is quadrilaterally shaped.

6. A lobster trap as set forth in claim 1 including means for locking the removable cover means to the outer shell.

7. A lobster trap as set forth in claim 6 wherein the locking means includes a rod passing through the outer shell and cover means.

8. A lobster trap as set forth in claim 1 including line means for hoisting and lowering the trap.

9. A lobster trap as set forth in claim 8 including a safety line for the cover means securing the cover means to the outer shell.

10. A lobster trap as set forth in claim 9 including a retainer associated with the cover means having means at one end for holding the line means external of the trap and means at an interior end to which the safety line is secured.

11. A lobster trap as set forth in claim 1 including a weight in the ramp causing the ramp to be tilted upwardly regardless of the position of the outer shell.

12. A lobster trap as set forth in claim 1 wherein said inner shell has a length at least on the order of one-half the length of the outer shell, said inner shell being supported adjacent the entrance to the outer shell and said support means for the inner shell defining a substantially open compartment for bait between the support means and cover means.

13. A lobster trap as set forth in claim 12 wherein said ramp is weighted and defines at its end an exit from the inner shell which is elevated from the bottom of the bait compartment.

14. A lobster trap as set forth in claim 1 wherein said ramp has water passages therein.

15. A lobster trap comprising; a housing that is pervious to the passage of water therethrough, means associated with the housing for providing access to the housing, means defining an entrance into the housing through which a lobster may pass, an inner member smaller than the housing and that is also pervious to the passage of water therethrough, said inner member having means defining a ramp extending in a direction away from the housing entrance, and means rotatably supporting said inner member in the housing.

16. A lobster trap as set forth in claim 15 wherein the ramp includes weight means causing the ramp to be tilted upwardly regardless of the position of the housing.

* * * * *